United States Patent
Davis et al.

(10) Patent No.: US 6,196,272 B1
(45) Date of Patent: Mar. 6, 2001

(54) MODULAR INSULATED PIPE

(76) Inventors: Mary Maureen Davis; Larry W. Holcomb, both of Rte. 2, Box 189 D, Johnston, SC (US) 29832

( * ) Notice: Subject to any disclaimer, the term of this patent is extended or adjusted under 35 U.S.C. 154(b) by 0 days.

(21) Appl. No.: 09/249,299

(22) Filed: Feb. 12, 1999

(51) Int. Cl.$^7$ .................................................. F16L 9/14
(52) U.S. Cl. ............................ 138/149; 138/141; 138/137
(58) Field of Search .................................. 138/149, 148, 138/114, 140, 137, 141

(56) References Cited

U.S. PATENT DOCUMENTS

| | | | |
|---|---|---|---|
| 4,595,615 | * 6/1986 | Cohen | 138/149 X |
| 4,824,705 | * 4/1989 | Persson et al. | 138/149 X |
| 4,930,543 | * 6/1990 | Zuiches | 138/149 X |
| 5,722,462 | 3/1998 | Dridi et al. | 138/149 |
| 5,775,379 | 7/1998 | Manofky et al. | 138/149 |
| 5,791,180 | 8/1998 | Onan et al. | 138/149 |
| 5,853,031 | * 12/1998 | De Oliveira | 138/149 |
| 5,964,252 | * 10/1999 | Simmons et al. | 138/149 |
| 5,996,643 | * 12/1999 | Stonitsch | 138/149 X |

\* cited by examiner

*Primary Examiner*—Patrick Brinson
(74) *Attorney, Agent, or Firm*—Siemens Patent Services, LC

(57) ABSTRACT

A modular insulated conduit, and a packaged kit comprising plural modular conduits. Each modular conduit has a conduit and an insulating sleeve adhered about the conduit. The conduit is longer than the insulating sleeve, extends beyond both ends of the sleeve, and may optionally be either rigid or flexible. Optionally, the modular conduit has a reflective barrier which may be between the conduit and sleeve or outside the sleeve. The kit includes connecting and branching fittings. The insulation is effective from subfreezing to hyperboiling temperatures.

21 Claims, 3 Drawing Sheets

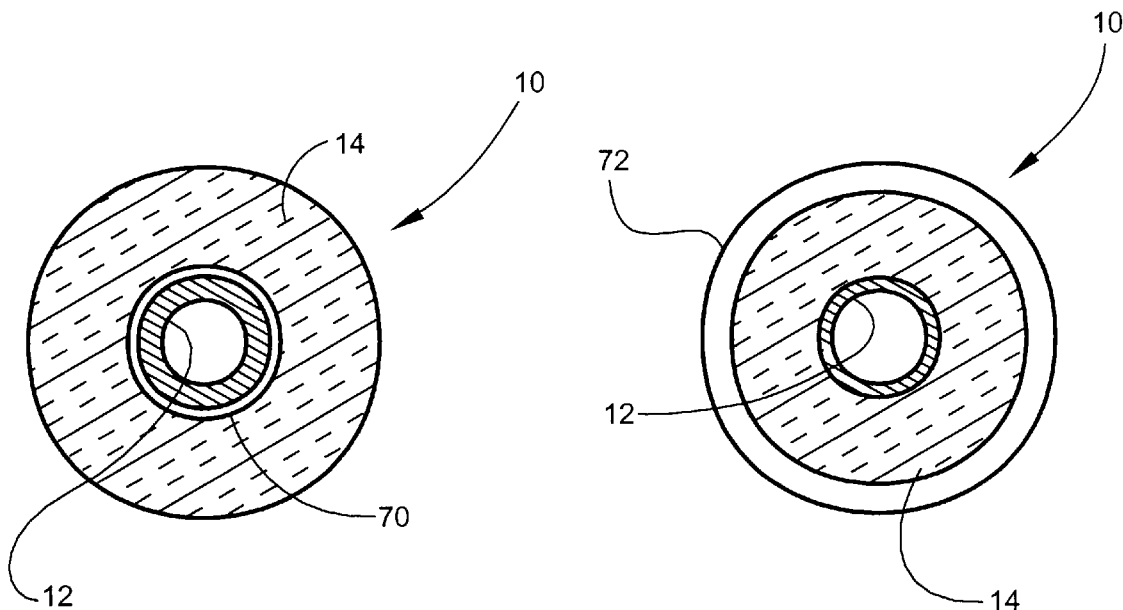
FIG. 3
FIG. 4
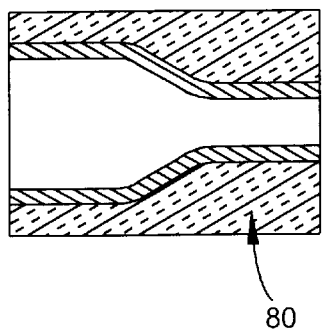
FIG. 5
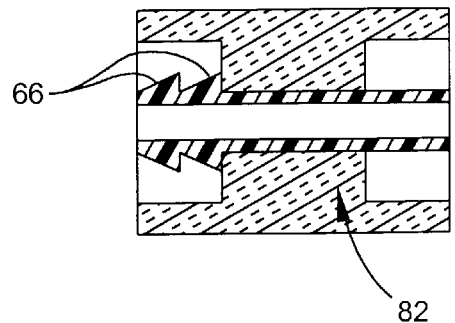
FIG. 6

MODULAR INSULATED PIPE

BACKGROUND OF THE INVENTION

1. Field of the Invention

The present invention relates to pipes and conduits, and more particularly to prefabricated pipes and conduits having a covering of temperature insulation adhered thereto. The novel insulated conduits are formed in a variety of configurations, such as straight and bent. In one embodiment of the invention, the invention comprises a kit comprising individual members of different configurations. The invention finds utility in construction of plumbing and other fluid handling conduit systems. In particular, the invention assists mechanics in installing and assembling such systems in new construction, renovation, repair, maintenance, of buildings. Construction and modification in other applications, such as industrial and commercial conduit systems, may also benefit from the invention.

2. Description of the Prior Art

Heating, plumbing, industrial and commercial liquid handling systems occasionally require insulation. In typical construction, renovation, and repair work, a system of conduits, such as pipes, is first assembled and subsequently insulated. This process is feasible when access to individual conduits and sections of conduits is available. However, in some situations, access is so severely limited that insulation cannot feasibly be installed after the conduit system is complete.

An example is seen in renovation of residential buildings wherein pipes are routed through walls and floors. Individual conduits may possibly pass through and near structural members such as joists, electrical and mechanical objects such as wiring, other pipes, ducts, fans and their housings, and the like. Proximity to such objects may render the usual methods of insulating impossible or nearly so without requiring dismantling of the interfering object or system. Yet there may be sufficient space in the building to accommodate the conduit and an insulating jacket.

The prior art has proposed insulated conduits. U.S. Pat No. 5,722,462, issued to Hamadi Dridi et al. On Mar. 3, 1998, describes a flexible insulated conduit having a conduit at its core, a wound insulating covering, and an external protective casing. By contrast, the present invention lacks an external protective casing, has an insulating covering which is not limited to wound construction, and has exposed portions of the conduit which extend outside the insulating cover.

U.S. Pat. No. 5,775,379, issued to William L. Manofsky et al. On Jul. 7, 1998, describes preformed insulating material which can be slipped over a conduit for the purpose of insulating the conduit. By contrast, the present invention includes a conduit disposed within the insulating cover, with the insulating cover adhered to the conduit. The insulating cover in the present invention cannot be pulled longitudinally along the conduit, as is practiced with the device of Manofsky et al.

U.S. Pat. No. 5,791,380, issued to David D. Onan et al. on Aug. 11, 1998, describes a construction wherein several pipes are bundled together and insulated. The present invention provides, by contrast, one conduit having its own insulating cover. Each section of insulated conduit in the present invention extends beyond the insulating cover. These characteristics are not seen in the bundled pipe of Onan et al.

None of the above inventions and patents, taken either singly or in combination, is seen to describe the instant invention as claimed.

SUMMARY OF THE INVENTION

The present invention sets forth modular insulated sections of conduit which can readily be joined into a system or network of piping or other conduit. Individual modules have exposed conduit stubs at each end, thereby enabling ready connection. The exposed joined stubs can be insulated after assembly of the system.

The insulation comprises a sleeve adhered to the conduit The insulated conduit is tubular in cross section, and of constant diameter along its insulated length. This configuration enables pre-insulated sections of conduit to be inserted into small or limited spaces which may not accommodate manual installation of insulation by traditional methods. It is thus possible to construct an insulated system of pipes or other conduit where either insulating the pipe after assembly of the piping system is not feasible or wherein substantial disassembly of existing building elements would be required to afford access for insulating the piping after the piping is installed and assembled.

One application for the present invention is repair or renovation of existing buildings. Piping may be run through tight quarters, such as interstitial floor spaces, in crawl spaces, attics with low roof structure, and other highly obstructed areas wherein it would not be feasible or economical to remove obstacles to construction of plumbing or other piping systems.

Preferably, the conduit and insulation are selected to be suitable for a wide range of temperatures. The same insulated piping may then be employed for different purposes. For example, maintenance of temperature in domestic hot water systems may accomplished in commercial buildings being updated without having to rely upon constant recirculation of hot water. Freeze protection equipment may possibly be obviated by replacing existing plumbing with the same novel pre-insulated piping employed in the hot water system. Condensation problems may possibly be forestalled in older homes being renovated by assembling new domestic cold water plumbing employing the same novel pre-insulated conduit as a stock building material. The present invention finds application wherever plumbing or other piping systems are being modified for repair, replacement, and other purposes in an existing structure.

There is no requirement that the conduit be rigid, as is typical of metallic piping. The conduit may comprise flexible hose. Rigid and non-rigid pre-insulated conduit types may be mixed in a single installation. This practice may enable a new piping system to be built around an old piping system being abandoned in place. Frequently, there is sufficient space for the first piping system, but the first piping system renders available space inadequate for construction of a superseding piping system unless considerable demolition is undertaken. The present invention allows piping to be fit into irregular spaces which would not necessarily be possible when building a plumbing or piping system from rigid metallic piping and tubing.

The modular set incudes fittings such as adapters and connectors to make transitions in direction from one modular conduit to another, to branch, to make transition in nominal conduit size, and the like.

Insulation is supplemented by a reflective barrier which is located selectively over or beneath the insulating sleeve.

Accordingly, it is one object of the invention to provide conduits such as pipes in pre-insulated, modular form.

It is another object of the invention to provide modular conduits in kit form, wherein plural sections of modular conduits may be obtained packaged together.

It is a further object of the invention that the insulation resist being displaced from the conduit being insulated.

Still another object of the invention is that ends of the conduit extend beyond the insulation, thereby being accessible for connection.

An additional object of the invention is to enable insulated piping to be slipped into tight quarters, thereby obviating necessity of wrapping piping with insulation under adverse conditions of accessibility and working space.

It is again an object of the invention to provide fittings enabling ready connection of one section of insulated conduit to another.

Yet another object of the invention is to provide the modular insulated conduit in rigid form.

A further object of the invention is to provide the modular insulated conduit in flexible form.

Still another object of the invention is to enhance insulation by providing a reflective barrier.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 3 is an end cross sectional detail view of an alternative embodiment of a component seen at the top of FIG. 1.

FIG. 4 is similar to FIG. 3, but shows a further alternative embodiment.

FIG. 5 is a cross sectional detail view of an optional component of a kit similar to that of FIG. 1.

FIG. 6 is a cross sectional detail view of another optional component of a kit similar to that of FIG. 1.

DETAILED DESCRIPTION OF THE PREFERRED EMBODIMENTS

Figure 1:
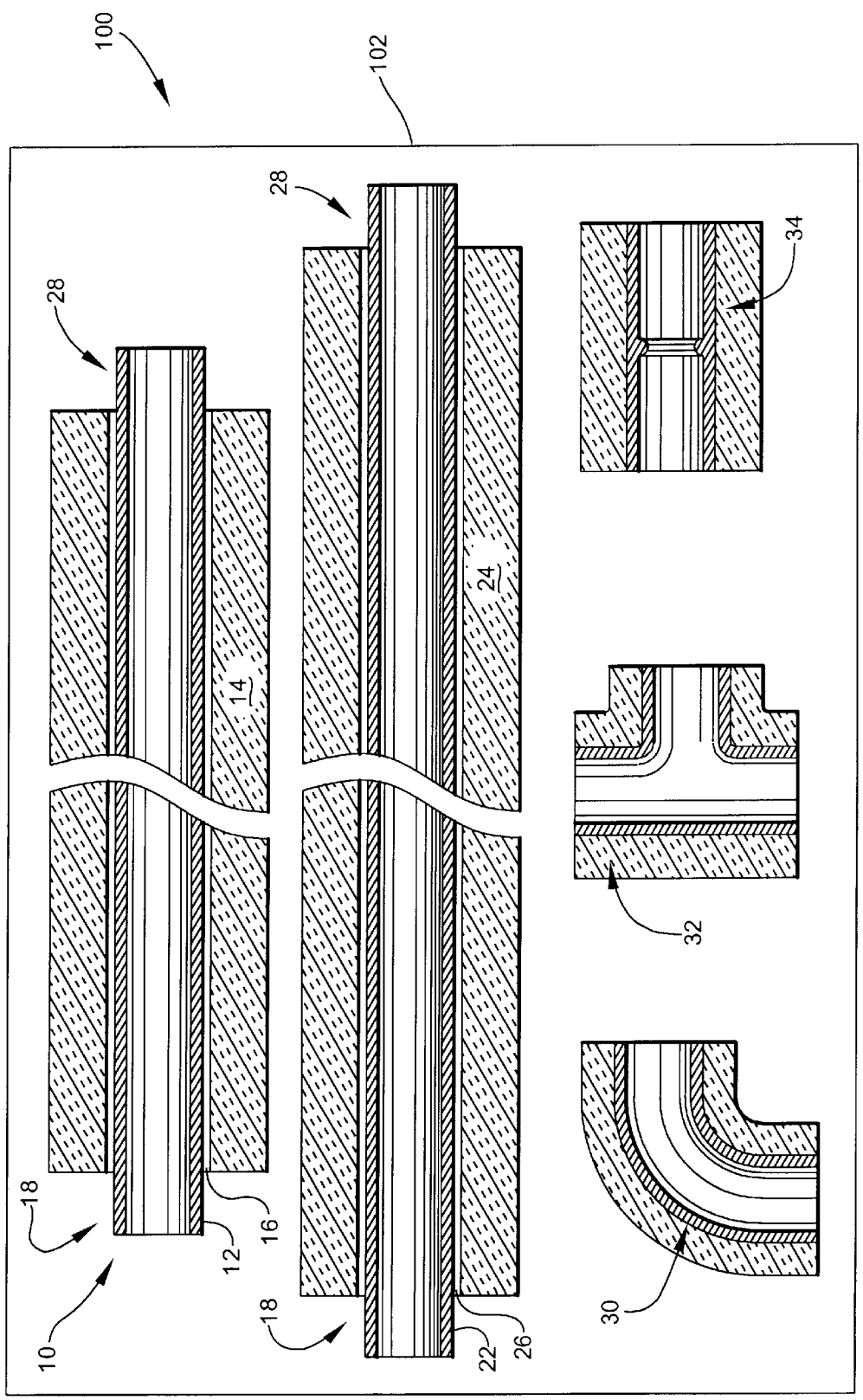
FIG. 1 is a diagrammatic, cross sectional view of one embodiment of the invention.

FIG. 1 of the drawings illustrates one embodiment of the invention wherein modules 10, 20 each include a rigid conduit or pipe 12 or 22 and an outer sleeve 14 or 24 of insulating material. Modules 10, 20 are pre-insulated fluid conduit modules. Pipes 12, 22 are formed from metal, plastic, or other suitable material capable of containing liquids and resisting temperatures in the range of 0 degrees Fahrenheit and 250 degrees Fahrenheit. The insulation material of sleeves 14, 24 is selected to have temperature insulating properties within the same range of temperatures and to resist deterioration due to exposure to temperatures of the same range. In a preferred embodiment of the invention, modules 10, 20 are furnished as part of a kit 100 which includes plural modules 10, 20, among other components conventionally employed to assemble a piping or conduit system in place. These components will be discussed hereinafter. Kit 100 is preferably contained within suitable packaging 102. Packaging 102 may comprise cardboard, plastic, or other material which is suitable for retaining components of kit 100 together and protecting the components during transit and retail or wholesale distribution.

Sleeves 14, 24 adhere to their associated conduit 12 or 22 such that they resist slipping, or being displaced longitudinally along conduit 12 or 14. Sleeves 14, 24 therefore will not inadvertently be lost while maneuvering a module 10 into place in tight quarters, where they could bind on an environmental object (not shown). Adhesion is accomplished in any suitable way. For example, a bonding agent 16 or 26, such as a temperature tolerant glue, may be applied to conduit 12 or 22 prior to encasing conduit 12 or 22 with its associated sleeve 14 or 24. Alternatively, sleeves 14, 24 may be cast in place on their respective conduits 12 or 22 and engage the conduits 12 or 22 by friction fit due to dimensions and configuration of sleeve 14 or 24. In a further example, sleeves 14, 24 may be adhered to conduits 12, 22 by fusion if the constituent materials are compatible.

An important feature of each module 10 or 20 is that the two ends of the associated conduit 12 or 22 extend beyond their respective sleeves 14 or 24, since conduit 12 or 22 is longer than and extends beyond the distal and proximal ends 18, 28 (respectively) of its associated insulating sleeve 14 or 24. This enables each conduit 12 or 22 to be joined to another module, to a connection fitting, to a conduit or component not furnished with kit 100, or terminated.

Kit 100 includes fittings enabling plural modules 10, 20 to be connected. In the embodiment of FIG. 1, fittings of kit 100 include an elbow 30, a tee connector 32, and a straight connector 34. Each fitting 30, 32, or 34 is dimensioned and configured to connect to the exposed conduit 12 or 22 in close cooperation therewith. The fitting may either slip over and surround conduit 12 or 22, or may be inserted into conduit 12 or 22, as desired. Sealing the assembled conduit system and fittings is performed conventionally. For example, if components are metallic, then components may be soldered together. If fabricated from a plastic material such as polyvinyl chloride, then conventional cements and glues may be employed to join and seal the assembled conduit system.

Figure 2:
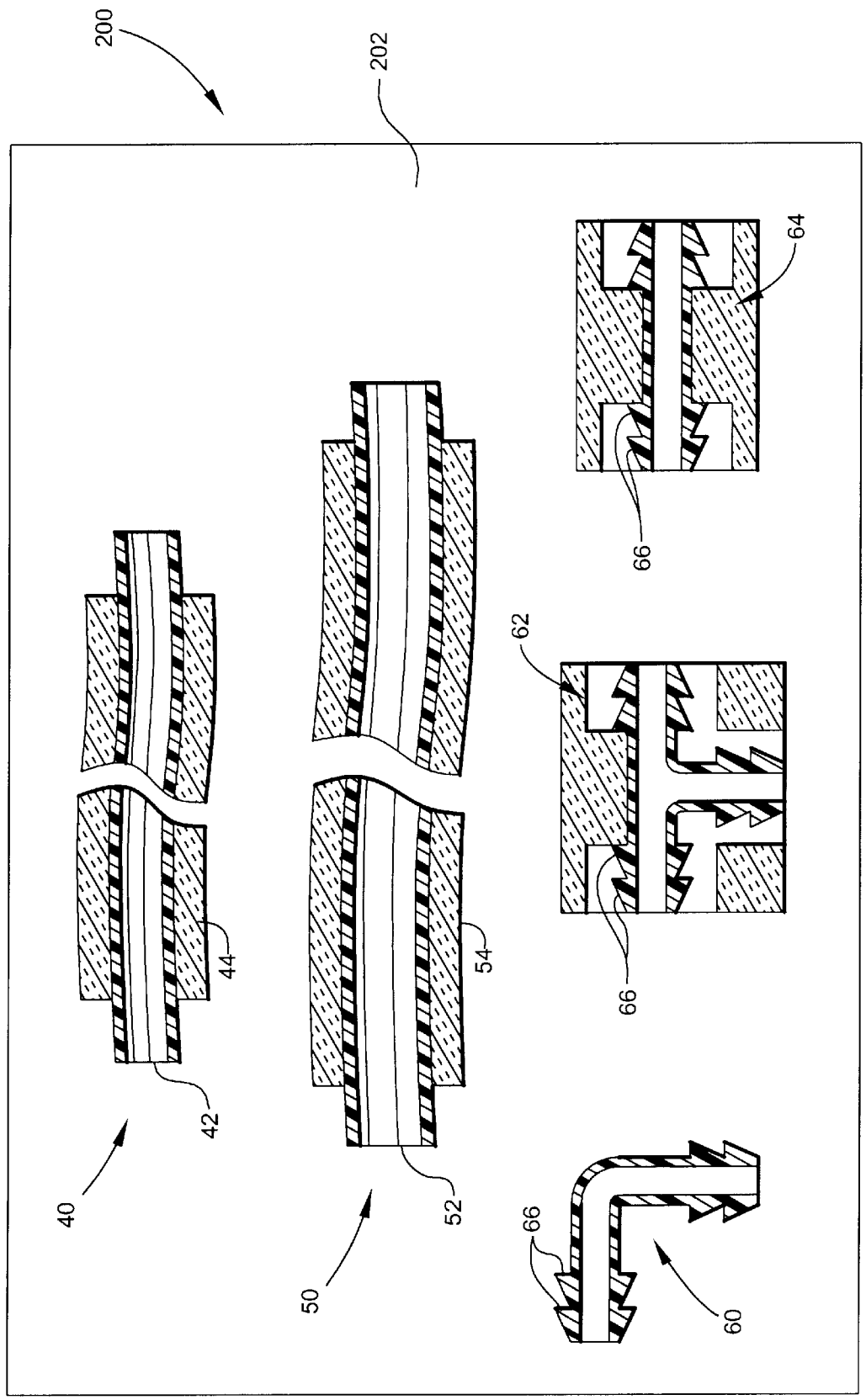
FIG. 2 is a diagrammatic, cross sectional view of a second embodiment of the invention.

FIG. 2 illustrates a second embodiment of the invention wherein modules 40, 50 are essentially similar to modules 10, 20 of FIG. 1, except that the constituent material of respective conduits 42, 52 is flexible. Insulating sleeves 44, 54 (respectively) are similar to their counterparts of FIG. 1. Kit 200 includes packaging 202. Fittings for kit 200 of FIG. 2 are correspondingly different. Fittings of kit 200, which is functionally similar to kit 100 except for flexibility of conduits 42, 52, include an elbow 60, a tee connector 62, and a straight connector 64. Each fitting 60, 62, or 64 has ribs 66 or functionally corresponding structure to engage and retain conduits 42, 52. Clamps (not shown) may be employed if desired to secure engagement of conduits 42, 52 and fittings 60, 62, 64.

FIG. 3 illustrates an optional feature of the invention. Module 10 has a reflective barrier 70 disposed between conduit 12 and insulating sleeve 14. In an alternative embodiment, as shown in FIG. 4, reflective barrier 72 covers insulating sleeve 14.

It will be appreciated that components of kit 100 or 200 may vary from those depicted. The number and dimensions of any one or more components may be varied. In particular, length of modules 10, 20 or 40, 50 may be different from other modules of the kit. Alternatively, inner or outer conduit diameters may vary from member to member in the kit. If the diameter varies, adapting connectors 80 (see FIG. 5) may be provided. Connector 80 has one end of relatively great diameter and an opposite end of relatively small diameter, the respective diameters corresponding to diameters of conduits of modules to be joined.

Similarly, a kit may include both rigid and flexible modules 10, 20 and 40, 50. Adapting connectors 82 may be provided to enable transition from rigid to flexible modules in an assembled conduit system (not shown). Connectors 82 have ribs 66 at one end and terminate at the other end in tubing which can engage a conduit 12, 22, 42, or 52 of a respective module 10, 20, 40, or 50.

It is preferred that the conduit and insulating sleeve of each module be circular in cross section and of constant diameter along the length. However, this is a convenience in manufacturing and handling individual components during assembly, and is not critical to the invention. Conduits could be square or of other cross sectional configurations if desired.

Where diameters and dimensions are recited as being different, the difference extends to nominal dimensions, these being industry standard sizes or dimensions, and not merely to variations of fabrication.

It is to be understood that the present invention is not limited to the embodiments described above, but encompasses any and all embodiments within the scope of the following claims.

What is claimed is:

1. A pre-insulated fluid conduit module comprising a conduit and an insulating sleeve of temperature insulating material disposed around said conduit and disposed to adhere to said conduit and to resist being displaced axially along said conduit, wherein said insulating sleeve has a proximal end and a distal end, and wherein said conduit is longer than said sleeve and extends beyond said insulating sleeve at said proximal end of said insulating sleeve and at said distal end of said insulating sleeve, wherein said insulating sleeve is formed from a material which resists deterioration due to exposure to temperatures in a range from 0 degrees Fahrenheit to 250 degrees Fahrenheit.

2. The fluid conduit module according to claim 1, wherein said conduit is rigid.

3. A pre-insulated fluid conduit module comprising a conduit and an insulating sleeve of temperature insulating material disposed around said conduit and disposed to adhere to said conduit and to resist being displaced axially along said conduit, wherein said insulating sleeve has a proximal end and a distal end, and wherein said conduit is longer than said sleeve and extends beyond said insulating sleeve at said proximal end of said insulating sleeve and at said distal end of said insulating sleeve, wherein said conduit is flexible.

4. The fluid conduit module according to claim 1, wherein said conduit is circular in cross section, and said insulating sleeve is circular in cross section and of constant diameter.

5. The fluid conduit module according to claim 1, further comprising a reflective barrier disposed between said conduit and said insulating sleeve.

6. The fluid conduit module according to claim 1, further comprising a reflective barrier covering said insulating sleeve.

7. A pre-insulated fluid conduit module comprising a conduit and an insulating sleeve of temperature insulating material disposed around said conduit and disposed to adhere to said conduit and to resist being displaced axially along said conduit, wherein said insulating sleeve has a proximal end and a distal end, and wherein said conduit is longer than said sleeve and extends beyond said insulating sleeve at said proximal end of said insulating sleeve and at said distal end of said insulating sleeve, said fluid conduit module having a bonding agent adhering said insulating sleeve to said conduit.

8. A pre-insulated fluid conduit module comprising a conduit and an insulating sleeve of temperature insulating material disposed around said conduit and disposed to adhere to said conduit and to resist being displaced axially along said conduit, wherein said insulating sleeve has a proximal end and a distal end, and wherein said conduit is longer than said sleeve and extends beyond said insulating sleeve at said proximal end of said insulating sleeve and at said distal end of said insulating sleeve, wherein said insulating sleeve is dimensioned and configured to adhere to said conduit by friction fit.

9. A pre-insulated fluid conduit module comprising a rigid conduit and an insulating sleeve of temperature insulating material disposed around said conduit and disposed to adhere to said conduit and to resist being displaced axially along said conduit, said fluid conduit module having a bonding agent adhering said insulating sleeve to said conduit, wherein said insulating sleeve has a proximal end and a distal end, and wherein said conduit is longer than said sleeve and extends beyond said insulating sleeve at said proximal end of said insulating sleeve and at said distal end of said insulating sleeve, wherein said conduit is circular in cross section, and said insulating sleeve is circular in cross section and of constant diameter, and said insulating sleeve is formed from a material which resists deterioration due to exposure to temperatures in a range from 0 degrees Fahrenheit to 250 degrees Fahrenheit, and wherein said fluid conduit module comprises a reflective barrier covering said insulating sleeve.

10. A kit of pre-insulated fluid conduit modules, comprising
   a first fluid conduit module having a first conduit and a first insulating sleeve of temperature insulating material disposed around said first conduit and disposed to adhere to said first conduit and disposed to resist being displaced axially along said first conduit, wherein said first insulating sleeve has a proximal end and a distal end, wherein said first conduit is longer than said first insulating sleeve and extends beyond said first insulating sleeve at said proximal end of said first insulating sleeve and at said distal end of said first insulating sleeve;
   a second fluid conduit module having a second conduit and a second insulating sleeve of temperature insulating material disposed around said second conduit and disposed to adhere to said second conduit and disposed to resist being displaced axially along said second conduit, wherein said second insulating sleeve has a proximal end and a distal end, wherein said second conduit is longer than said second insulating sleeve and extends beyond said second insulating sleeve at said proximal end of said second insulating sleeve and at said distal end of said second insulating sleeve, said second fluid conduit module being of different nominal dimensions from those of said first fluid conduit module; and
   packaging enclosing said first fluid conduit module and said second fluid conduit module.

11. The kit according to claim 10, further comprising a connector fitting dimensioned and configured to fit in close cooperation with said first conduit of said first fluid conduit module and with said second conduit of said second fluid conduit module.

12. The kit according to claim 10, further comprising a tee connector fitting dimensioned and configured to fit in close cooperation with said first conduit of said first fluid conduit module and with said second conduit of said second fluid conduit module.

13. The kit according to claim 10, wherein said first conduit of said first fluid conduit module is rigid.

14. The kit according to claim 10, wherein said first conduit of said first fluid conduit module is flexible.

15. The kit according to claim 10, wherein said first fluid conduit module includes a reflective barrier covering said first insulating sleeve.

16. The kit according to claim 10, wherein said first fluid conduit module includes a reflective barrier disposed between said first conduit and said first insulating sleeve.

17. The kit according to claim 10, said first fluid conduit module and said second fluid conduit module each having a bonding agent adhering a said insulating sleeve to its associated said conduit.

18. The kit according to claim 10, wherein each said insulating sleeve is dimensioned and configured to adhere to its associated said conduit by friction fit.

19. A pre-insulated fluid conduit arrangement comprising:
   at least one conduit module including:
      an elongate pipe, and
      an insulating sleeve of temperature insulating material mounted on and surrounding said pipe, said insulating sleeve mounted on said pipe such that said sleeve resists displacement of said sleeve axially of said pipe; and
   at least one connector module including:
      a fitting adapted to be connected to one end of said pipe on said conduit module, and
      an insulating layer around said fitting, said insulating sleeve and said insulating layer constructed and arranged to substantially cover the exterior of said pipe and said fitting after said fitting is attached to said conduit.

20. The arrangement of claim 19 wherein said fitting is adapted to receive one of said pipe therein; wherein that end of said pipe received in said fitting projects beyond said insulating sleeve therearound by a distance corresponding to the distance said pipe projects into said fitting; and wherein said insulating layer around said fitting terminates in the plane of that end of said fitting into which said pipe projects.

21. The arrangement of claim 19 wherein said fitting is adapted to project into one end of said pipe; wherein that end of said pipe received in said fitting projects beyond said insulating sleeve therearound by a distance corresponding to the distance said fitting projects into said pipe; and wherein said insulating layer around said fitting terminates in the plane of that end of said fitting into which said pipe projects and defines a recess therein around the projecting end of said fitting sized to receive the end of said pipe therein.

* * * * *